US012612158B2

(12) United States Patent
Fujii et al.

(10) Patent No.: US 12,612,158 B2
(45) Date of Patent: Apr. 28, 2026

(54) CONTROL APPARATUS FOR ELECTRIC AIRCRAFT

(71) Applicant: DENSO CORPORATION, Kariya-city (JP)

(72) Inventors: Keita Fujii, Kariya-city (JP); Mariko Hashimoto, Kariya-city (JP); Shun Sugita, Kariya-city (JP); Naoki Tanimoto, Kariya-city (JP)

(73) Assignee: DENSO CORPORATION, Kariya (JP)

( * ) Notice: Subject to any disclaimer, the term of this patent is extended or adjusted under 35 U.S.C. 154(b) by 125 days.

(21) Appl. No.: 18/522,792

(22) Filed: Nov. 29, 2023

(65) Prior Publication Data

US 2024/0092183 A1 Mar. 21, 2024

Related U.S. Application Data

(63) Continuation of application No. PCT/JP2022/013467, filed on Mar. 23, 2022.

(30) Foreign Application Priority Data

May 31, 2021 (JP) ................................. 2021-090953

(51) Int. Cl.
*B64C 29/00* (2006.01)
*B08B 1/12* (2024.01)
(Continued)

(52) U.S. Cl.
CPC ............ *B64C 29/0016* (2013.01); *B08B 1/12* (2024.01); *B08B 1/20* (2024.01); *B08B 3/022* (2013.01);
(Continued)

(58) Field of Classification Search
None
See application file for complete search history.

(56) References Cited

U.S. PATENT DOCUMENTS

| | | | | | |
|---|---|---|---|---|---|
| 9,790,808 | B2 * | 10/2017 | Rice | ...................... | F01D 25/002 |
| 11,235,893 | B2 * | 2/2022 | Topf | ........................ | B08B 3/024 |

(Continued)

FOREIGN PATENT DOCUMENTS

| | | | | |
|---|---|---|---|---|
| CN | 107804476 | A | 3/2018 | |
| CN | 110525232 | A * | 12/2019 | ............... B60H 1/00 |

(Continued)

OTHER PUBLICATIONS

Machine translation of Di et al. (CN-110525232-A) (Year: 2019).*

(Continued)

*Primary Examiner* — Navid Z. Mehdizadeh
*Assistant Examiner* — Sarah A. Mueller
(74) *Attorney, Agent, or Firm* — Oliff PLC

(57) ABSTRACT

A control apparatus, which controls a drive motor that drives a rotor installed in an electrical aircraft, instructs the drive motor to selectively operate in at least two motor-control modes. The at least two motor-control modes include a flying motor-control mode for causing the electrical aircraft to fly, and a cleaning motor-control mode for cleaning the rotor. The control apparatus controls, in the cleaning motor-control mode, the drive motor such that a rotational frequency of the drive motor is lower than a predetermined human-audible frequency range.

10 Claims, 5 Drawing Sheets

(51) Int. Cl.

| | |
|---|---|
| *B08B 1/20* | (2024.01) |
| *B08B 3/02* | (2006.01) |
| *B60L 3/12* | (2006.01) |
| *B60L 15/20* | (2006.01) |
| *B64D 27/30* | (2024.01) |
| *B64D 27/34* | (2024.01) |
| *B64D 31/16* | (2024.01) |
| *B64F 5/30* | (2017.01) |
| *G05D 1/00* | (2024.01) |

(52) U.S. Cl.
CPC ................ *B60L 3/12* (2013.01); *B60L 15/20* (2013.01); *B64D 27/30* (2024.01); *B64D 27/34* (2024.01); *B64D 31/16* (2024.01); *B64F 5/30* (2017.01); *G05D 1/101* (2013.01); *B08B 2203/02* (2013.01); *B60L 2200/10* (2013.01); *B64C 29/0008* (2013.01)

(56) References Cited

U.S. PATENT DOCUMENTS

| | | |
|---|---|---|
| 2002/0102158 A1 | 8/2002 | Otsuka |
| 2002/0129837 A1 | 9/2002 | Ruiz et al. |
| 2006/0081521 A1 | 4/2006 | Hjerpe et al. |
| 2008/0040872 A1 | 2/2008 | Hjerpe |
| 2008/0149141 A1 | 6/2008 | Sales |
| 2008/0216873 A1 | 9/2008 | Hjerpe et al. |
| 2009/0120461 A1* | 5/2009 | Johnson ................. B01D 65/08 134/13 |
| 2010/0031977 A1 | 2/2010 | Sales |
| 2013/0240002 A1 | 9/2013 | Hjerpe |
| 2014/0083466 A1 | 3/2014 | Sales, Jr. et al. |
| 2014/0203739 A1* | 7/2014 | Chantriaux ........... H02K 7/116 310/112 |
| 2015/0083169 A1 | 3/2015 | Hjerpe |
| 2015/0354404 A1 | 12/2015 | Ekanayake et al. |
| 2016/0251978 A1 | 9/2016 | Sales, Jr. et al. |
| 2021/0125406 A1 | 4/2021 | Henry et al. |
| 2021/0253232 A1* | 8/2021 | Benedict ............... B64D 17/80 |
| 2022/0169377 A1* | 6/2022 | Bustamante ........... B64C 27/06 |

FOREIGN PATENT DOCUMENTS

| | | |
|---|---|---|
| DE | 102015117227 A1 | 4/2017 |
| WO | 2006/107476 A1 | 10/2006 |

OTHER PUBLICATIONS

Jenson, J.J., "Hull Girder Vibrations", 2001, Elsevier Ocean Engineering Series (Year: 2001).*

Jun. 14, 2022 International Search Report issued in International Patent Application No. PCT/JP2022/013467.

* cited by examiner

FIG.3

CONTROL APPARATUS FOR ELECTRIC AIRCRAFT

REFERENCE TO RELATED APPLICATIONS

This application is a bypass continuation application of currently pending international application No. PCT/JP2022/013467 filed on Mar. 23, 2022 designating the United States of America, the entire disclosure of which is incorporated herein by reference, the international application being based on and claiming the benefit of priority from Japanese Patent Application No. 2021-90953 filed on May 31, 2021, the disclosure of which is incorporated in their entirety herein by reference.

TECHNICAL FIELD

The present disclosure relates to control apparatuses for electric aircrafts.

BACKGROUND OF THE INVENTION

Known cleaning systems for aircraft include a cleaning system disclosed in Japanese Patent Application Publication (translation of PCT application) NO. 2008-537583. The cleaning system for an engine mounted to a blade of an aircraft, which is disclosed in the patent publication, is configured to guide cleaning fluid to the engine while the engine is controlled to rotate at a predetermined rotational speed. The rotational speed of the engine is controlled to be substantially 20 percent of a predetermined reference rotational speed used during flight of the aircraft.

SUMMARY

The cleaning system disclosed in the patent publication, which operates with the lower rotational speed of the engine, may not address noise due to the rotation of the engine.

Let us assume that the cleaning system disclosed in the patent publication is used to clean a rotor of an electric aircraft; the rotor is rotated by a motor of the electric aircraft. In this assumption, noise due to rotation of the motor may become a major issue. This may be because it is assumed that a place where such an electric aircraft is stored is located near houses and/or commercial facilities.

From this viewpoint, users desire a technology that can clean a rotor of an electric aircraft while preventing an excessive increase in noise.

The present disclosure can be implemented by the following exemplary aspects.

The present disclosure provides control apparatuses for electrical aircrafts. Specifically, such a control apparatus according to an exemplary aspect of the present disclosure is used to control a drive motor that drives a rotor installed in an electrical aircraft. The control apparatus of the exemplary aspect is configured to instruct the drive motor to selectively operate in at least two motor-control modes. The at least two motor-control modes include a flying motor-control mode for causing the electrical aircraft to fly, and a cleaning motor-control mode for cleaning the rotor. The control apparatus of the exemplary aspect is configured to control, in the cleaning motor-control mode, the drive motor such that a rotational frequency of the drive motor is lower than a predetermined human-audible frequency range.

The control apparatus according to the exemplary aspect controls, in the cleaning motor-control mode, the drive motor such that the rotational frequency of the drive motor is lower than the predetermined human-audible frequency range, making it possible to clean the rotor of the electrical aircraft while preventing an excessive increase in noise due to rotation of the drive motor.

BRIEF DESCRIPTION OF THE DRAWINGS

The above object, other objects, characteristics, and advantageous benefits of the present disclosure will become apparent from the following description with reference to the accompanying drawings in which:

FIG. 3 is a block diagram illustrating a functional configuration of the electric vertical take-off and landing aircraft;

DETAILED DESCRIPTION

Exemplary Embodiment

(I) Configuration

Figure 1:
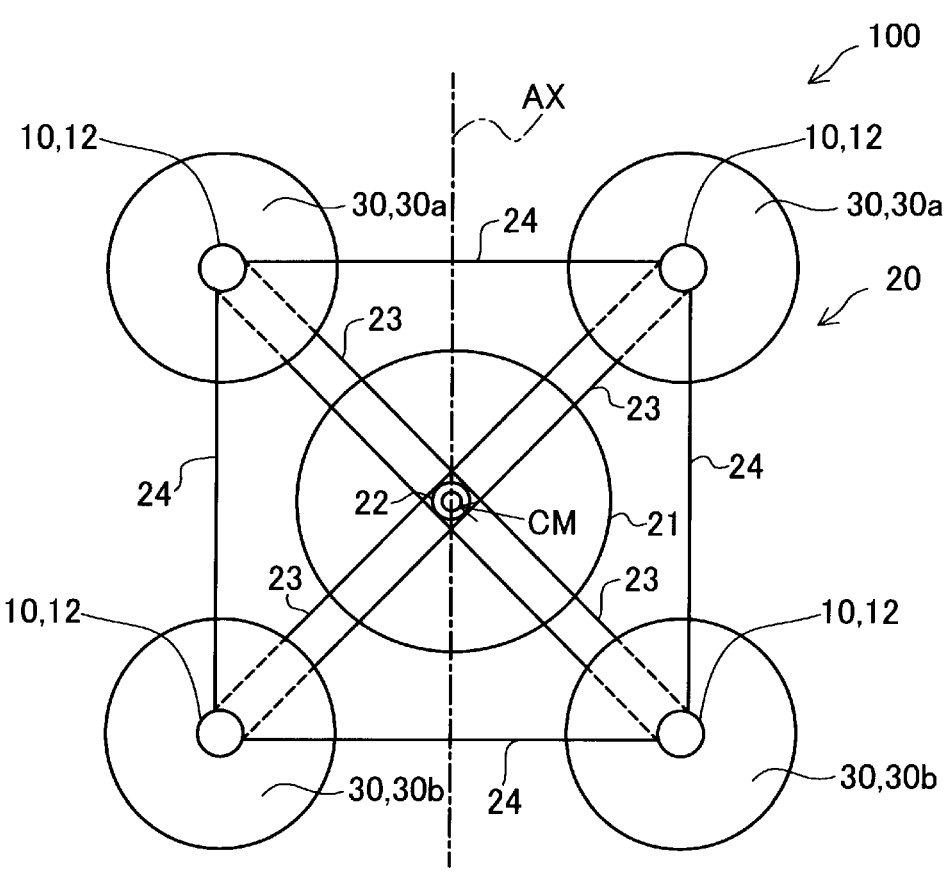
FIG. 1 is a top plan view of an electric vertical take-off and landing aircraft, which schematically illustrates a configuration of the electric vertical take-off and landing aircraft in which a control apparatus according to an exemplary embodiment of the present disclosure has been installed.
Figure 2:
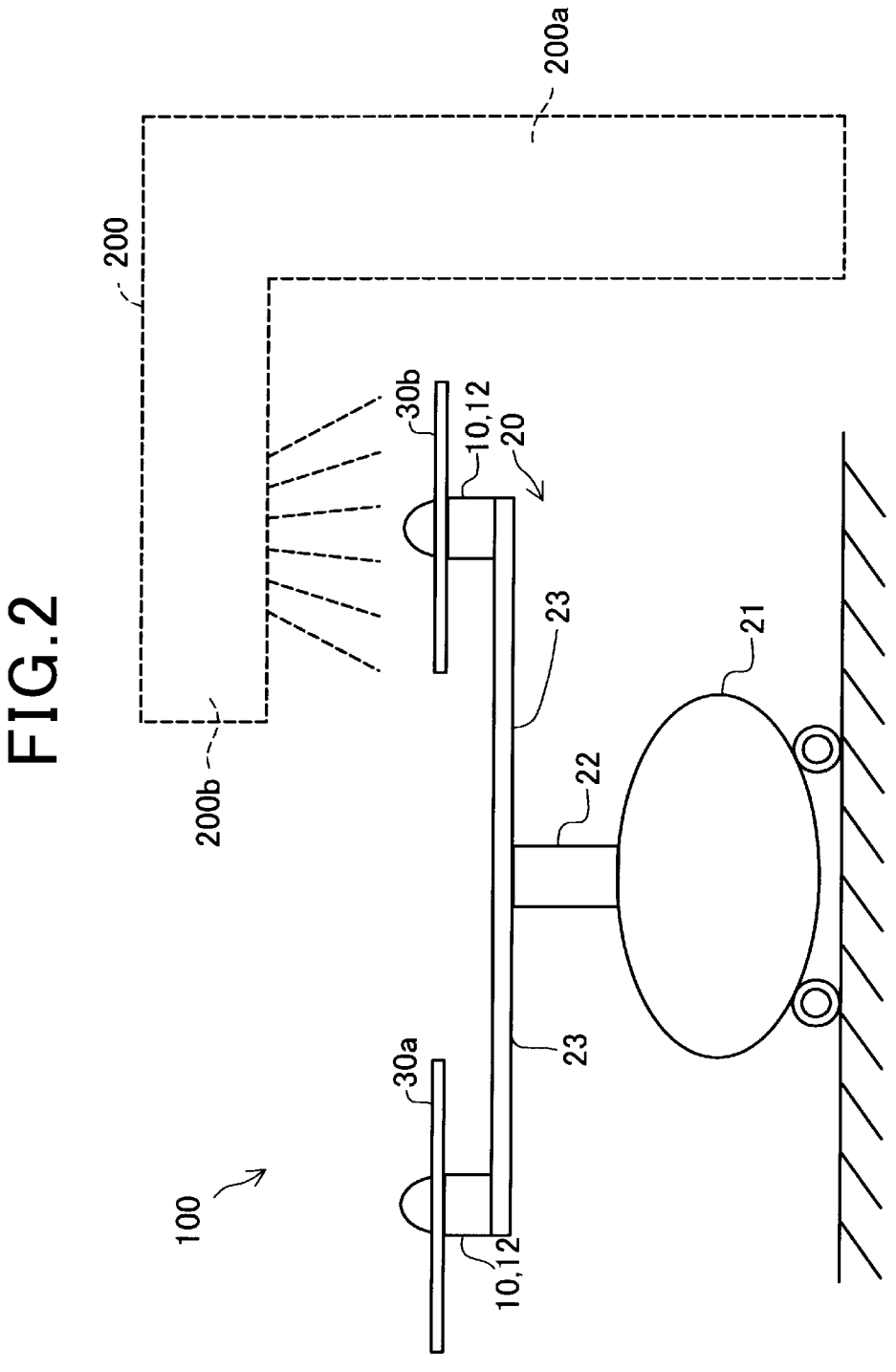
FIG. 2 is a side view of the electric vertical take-off and landing aircraft, which schematically illustrates how cleaning equipment sprays cleaning fluid to a rotor of the electric vertical take-off and landing aircraft.

Electric drive systems (EDS) 10, to each of which a control apparatus 19 according to an exemplary embodiment of the present invention has been applied, are installed in an electric vertical take-off and landing aircraft (eVTOL) 100 illustrated in FIGS. 1 and 2. The eVTOL 100 includes a plurality of rotors, i.e., rotor fans, 30, and each EDS 10 is provided for the corresponding rotor 30, and is configured to control the corresponding rotor 30.

Figure 3:
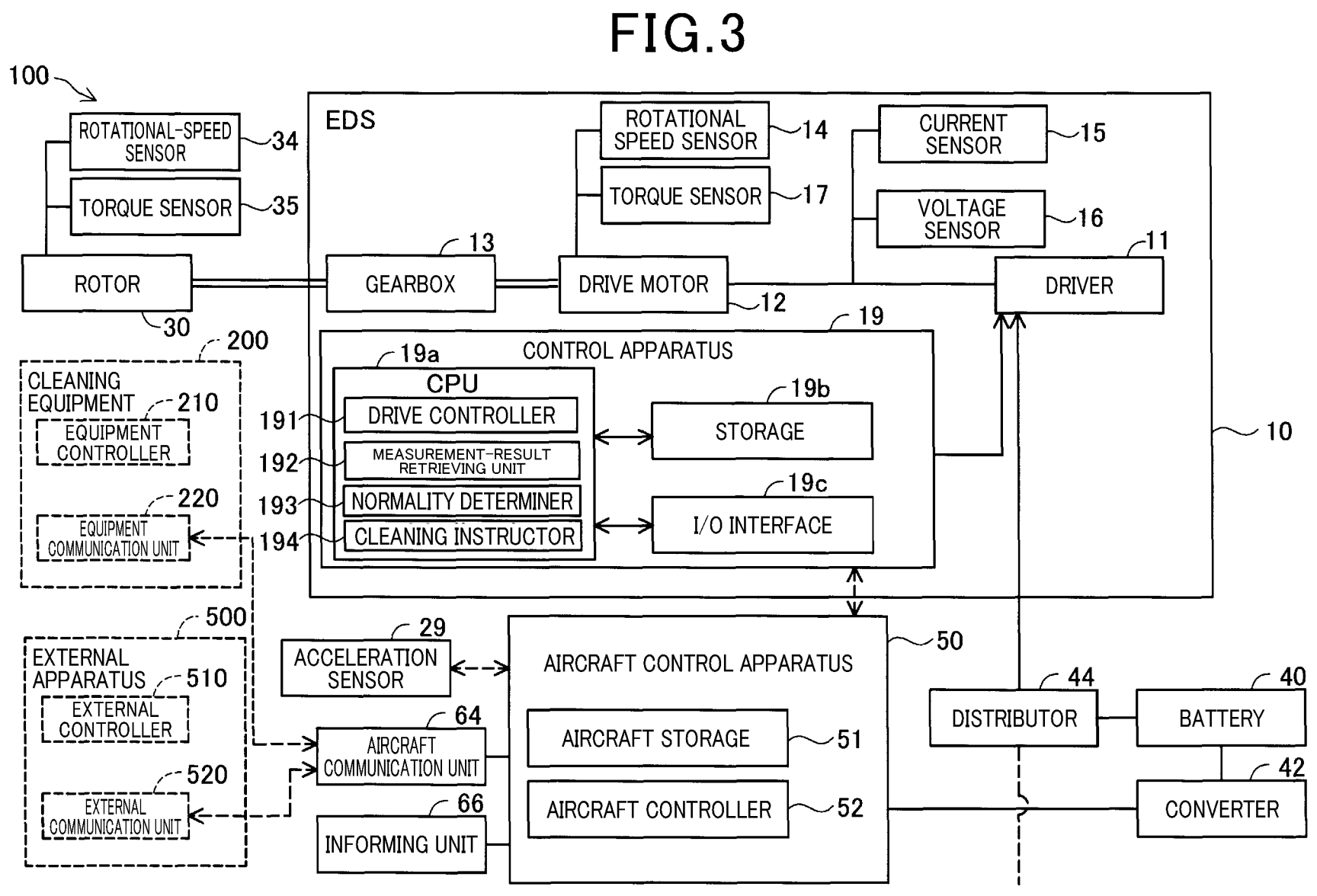

The eVTOL 100 is configured as an electrically-driven uncrewed aircraft that can land and take off vertically. The eVTOL 100 includes, in addition to the EDSs 10, an airframe 20, a battery 40, a converter 42, a distributor 44, an aircraft control apparatus 50, an aircraft communication unit 64, and an informing unit 66; these components 40, 42, 44, 50, 64, and 66 are illustrated in FIG. 3.

The aircraft control apparatus 50 is configured as a computer including an unillustrated central processing unit (CPU) and an aircraft storage 51. The aircraft storage 51, which includes a read only memory (ROM) and a random-access memory (RAM), stores one or more control programs. The CPU is configured to run the one or more control programs stored in the aircraft storage 51 to accordingly serve as an aircraft controller 52 that controls overall operations of the eVTOL 100.

The eVTOL 100 includes, as its overall operations, vertical landing and taking-off operations and a flying operation. The eVTOL 100 can be configured to perform the vertical landing and taking-off operations and flying operation in accordance with information indicative of a previously scheduled air-route or instructions sent from an external controller 510 included in an external apparatus 500 described later.

The aircraft controller 52 is configured to individually control a rotational angle of each rotor 30.

Additionally, the aircraft controller 52 is configured to instruct the control apparatus 19 to operate in a selected one of flying motor-control mode, a cleaning motor-control mode and a stop mode for controlling a drive motor 12 of a selected EDS 10.

The flying mode represents a mode of controlling each drive motor 12 to thereby cause the eVTOL 100 to take a flight set forth above.

The cleaning motor-control mode represents a mode of causing the drive motor 12 of the selected EDS 10 to clean the rotor 30 of the selected EDS 10

The stop mode represents a mode of stopping the drive motor 12 of the selected EDS 10.

The eVTOL 100 of the exemplary embodiment includes, as illustrated in FIG. 1, four rotors 30 and corresponding four EDSs 10. For the sake of simply illustration, FIG. 2 illustrates typical two of the four rotors 30 and corresponding typical two of the four EDSs 10, and FIG. 3 illustrates a typical one of the four rotors 30 and a corresponding typical one of the four EDSs 10.

The airframe 20 constitutes the remaining portion of the eVTOL 100 from which the four rotors 30 and the four EDSs 10 have been removed. The airframe 20 is comprised of an airframe body 21, a support strut 22, four first support members 23, and four second support members 24.

The airframe body 21 constitutes the fuselage of the eVTOL 100. The eVTOL 100 has a center of gravity CM and a body axis AX, and the airframe body 21 has a bilaterally symmetrical structure with respect to the body axis AX. The body axis AX of the eVTOL 100 according to the exemplary embodiment is defined as an axis that passes through the center of gravity CM and extends along a predetermined front-back direction of the eVTOL 100. The center of gravity CM of the eVTOL 100 is defined as the center of gravity of the eVTOL 100 with empty weight, such as no cargo.

The eVTOL 100 includes an acceleration sensor 29 mounted to the airframe 21. The acceleration sensor 29 is configured as a three-axis acceleration sensor, and measures a degree of tilt of the eVTOL 100 with respect to each axis and/or vibrations related to the eVTOL 100. The measurement results by the acceleration sensor 29 are outputted therefrom to the aircraft control apparatus 50.

The support strut 22 has a substantially pole-shaped outline, and is secured to the top of the airframe body 21. The support strut 22 extends vertically with the eVTOL 100 being stopped on the ground. The support strut 22 according to the exemplary embodiment is arranged to overlap the center of gravity CM of the eVTOL 100 when viewed in the vertical direction. The support strut 22 has an upper end, and each of the four first support members 23 has opposing first and second ends. The first end of each first support member 23 is individually secured to the upper end of the support strut 22.

Each of the four first support members 23 has a substantially rodlike outline. The first support members 23 are arranged circumferentially at regular intervals while respectively extending radially along a vertical plane perpendicular to the vertical direction. To the second end of each first support member 23, which is located farther from the support strut 22 than the first end is, the corresponding rotor and the corresponding EDS 10 are mounted.

Each of the four second support members 24 has a substantially rodlike outline, and joins the respective second ends of a corresponding pair of adjacent first support members 23. For the sake of simplifying illustration, FIG. 1 illustrates each second support member 24 as a straight line.

Each of the four rotors 30 is, as illustrated in FIG. 1, is mounted to the first end of the corresponding first support member 23, and is also mounted to ends of corresponding adjacent second support members 24; the ends of the corresponding adjacent second support members 24 are joined to the first end of the corresponding first support member 23.

The four rotor 30 include two front rotors 30a and two rear rotors 30b. The front rotors 30a are located forward of the center of gravity CM of the eVTOL 100, and the rear rotors 30b are located to the rear of the center of gravity CM of the eVTOL 100.

The four rotors 30 serve as both lifting rotors for lifting the airframe 20, and cruising rotors for causing the airframe 20 to cruise. Specifically, controlling all the four rotors 30 to have a predetermined rotational speed enables the four rotors 30 to serve as lifting rotors. Controlling the rotational speed of the front rotors 30a and that of the rear rotors 30b to be different from each other enables the four rotors 30 to serve as cruising rotors.

Each rotor 30 has a rotary shaft, and is individually controlled to rotate together with the corresponding rotary shaft.

The eVTOL 100 includes a rotational speed sensor 34 and a torque sensor 35 provided for each rotor 30. The rotational speed sensor 34 provided for each rotor 30 is configured to measure the rotational speed of the corresponding rotor 30. The torque sensor 35 provided for each rotor 30 is configured to measure rotating torque of the corresponding rotor 30. The measurement results by each rotational speed sensor 34 are outputted therefrom to the aircraft control apparatus 50, and the measurement results by each torque sensor 35 are outputted therefrom to the aircraft control apparatus 50. Each rotor 30 is connected to the corresponding EDS 10.

Each EDS 10 connected to the corresponding rotor 30 is configured as an electrical drive system for rotatably driving the corresponding rotor 30. That is, each EDS 10 is configured to rotatably drive the corresponding rotor 30.

Each EDS 10 includes, as illustrated in FIG. 3, a driver 11, a drive motor 12, a gearbox 13, a rotational speed sensor 14, a current sensor 15, a voltage sensor 16, a torque sensor 17, and the control apparatus 19 described above.

The driver 11 is configured as an electronic device comprised of an unillustrated inverter and a controller for controlling the inverter. The inverter is comprised of power switching devices, such as insulated gate bipolar transistors (IGBTs) and/or metal-oxide-semiconductor field-effect transistors (MOSFETs). The inverter is configured to supply, to the drive motor 12, a drive voltage that is determined based on a duty factor; the duty factor is specified by a control signal supplied from the controller. The controller of the driver 11 is electrically connected to the control apparatus 19, and is configured to supply the control signal to the inverter based on an instruction supplied from the control apparatus 19.

The drive motor 12 is comprised of, for example, a brushless motor according to the exemplary embodiment. The drive motor 12 is configured to output, to the gearbox 13, rotating motion in accordance with the drive voltage and a drive current supplied from the inverter of the driver 11. The drive motor 12 can be comprised of any motor, such as an induction motor or a reluctance motor in place of the brushless motor.

The gearbox 13 physically joins the drive motor 12 and the rotor to each other. Specifically, the gearbox 13, which is comprised of a plurality of gears, is configured to reduce the rotating motion supplied from the drive motor 12 to accordingly transfer the reduced rotating motion to the rotor 30. The gearbox 13 can be omitted, so that the rotary shaft of the rotor 30 can be directly coupled to the drive motor 12.

The rotational speed sensor 14 and the torque sensor 17 are provided for the drive motor 12. The rotational speed sensor 14 is configured to measure the rotational speed of the drive motor 12. The torque sensor 17 is configured to measure rotating torque generated by the drive motor 12.

The current sensor 15 and the voltage sensor 16 are arranged between the driver 11 and the drive motor 12. The current sensor 15 is configured to measure the drive current supplied from the driver 11 to the drive motor 12, and the voltage sensor 16 is configured to measure the drive voltage supplied from the driver 11 to the drive motor 12.

The measurement results by each of the sensors 14 to 17 are outputted therefrom to the control apparatus 19 through the driver 11.

The control apparatus 19 provided for each EDS 10 is configured as a computer comprised of a CPU 19a, a storage 19b, an input/output (I/O) interface 19c.

The storage 19b stores one or more control programs. The CPU 19a is configured to run the one or more control programs stored in the storage 19b to function as a drive controller 191, a measurement-result retrieving unit 192, a normality determiner 193, and a cleaning instructor 194.

The drive controller 191 is configured to send, to the driver 11, control instructions based on commanded values sent from the aircraft control apparatus 50 to accordingly rotatably drive the corresponding rotor 30. The commanded values include, for example, a commanded rotational speed for the drive motor 12 in each of motor-control modes; the motor-control modes include a flying motor-control mode and a cleaning motor-control mode.

Specifically, the drive controller 191 instructs, based on the commanded rotational speed for the drive motor 12 in the cleaning motor-control mode, the driver 11 to rotate the drive motor 12 at a controlled rotational speed whose equivalent rotational frequency that is lower than a predetermined human-audible frequency range. For example, the drive controller 191 instructs the driver 11 to rotate the drive motor 12 at a controlled rotational speed whose equivalent rotational frequency is lower than a predetermined human-audible frequency range. For example, the drive controller 19 controls, through the driver 11, the drive motor 12 such that the frequency of rotation of the drive motor 12 is lower than 20/A Hz where A represents a positive integer indicative of the number of blades of the rotor 30.

The measurement-result retrieving unit 192 is configured to retrieve the measurement results including (I) The rotational speed of the drive motor 12 from the rotational speed sensor 14

(II) Information on a rotating resistance related to the rotational speed of the corresponding rotor 30 from the rotational speed sensor 34

(III) The drive current from the current sensor 15

(IV) The drive voltage from the voltage sensor 16

(V) The level of vibrations related to the eVTOL 100 from the acceleration sensor 29

(VI) The degree of tilt of the eVTOL 100 from the acceleration sensor 29

The normality determiner 193 is configured to determine, based on the measurement results retrieved by the measurement-result retrieving unit 192, whether there is an abnormal situation in the eVTOL 100. How the normality determiner 193 determines whether there is an abnormal situation in the eVTOL 100 will be described later.

The cleaning instructor 194 is configured to instruct cleaning equipment 200 illustrated in FIGS. 2 and 3 to perform a cleaning task for cleaning the rotors 30 in the cleaning motor-control mode.

The cleaning instructor 194 is additionally configured to instruct the cleaning equipment 200 to stop the cleaning routine when it is determined that there is an abnormal situation in the eVTOL 100 during controlling of the drive motor 12 in the cleaning motor-control mode.

The cleaning equipment 200 of the exemplary embodiment is comprised of, as illustrated in FIG. 2, a first pole member 200a and a second pole member 200b. The first pole member 200a is located on the ground to extend in perpendicular to the ground. The second pole member 200b extends horizontally from the extending end of the first pole member 200a. Specifically, the first and second pole members 200a and 200b are integrated with each other to have a substantially L shape. The first pole member 200a is configured such that its height relative to the ground is adjustable.

The cleaning equipment 200 includes, as illustrated in FIG. 3, a equipment controller 210 and an equipment communication unit 220. The equipment controller 210 is configured to perform control of the cleaning equipment 200. Specifically, the equipment controller 210 performs control of at least the cleaning equipment 200 for spraying cleaning fluid, performing cleaning of any object using one or more brushes, and/or drying the cleaned object. FIG. 2 for example illustrates that the cleaning equipment 200 is spraying cleaning fluid to the eVTOL 100.

The equipment communication unit 220 has a function of performing wireless communications with any device. For example, the equipment communication unit 220 can communicate with the aircraft communication unit 64. As the wireless communications, the equipment communication unit 220 can use (i) commercial very high frequency (VHF) telecommunications, (ii) telecommunications, such as fourth-generation technology standard telecommunications (4G) or fifth-generation technology standard telecommunications (5G), provided by telecommunication cooperations, and/or (iii) wireless LAN communications in accordance with, for example, the IEEE 802.11 communications standard. The equipment communication unit 220 can use wired communications in accordance with the universal serial bus (USB) standard or the IEEE 802.3 communications standard.

The cleaning equipment 200 is configured to execute cleaning of at least one of the rotors 30 in accordance with a cleaning program previously stored in the storage 19b. The cleaning program includes, for example, (i) a cleaning-fluid spraying phase, (ii) a brushing phase, and (iii) a drying phase. For example, execution time setting for each of the cleaning-fluid spraying phase, brushing phase, and drying phase can be inputted from the external apparatus 500.

As the external apparatus 500, can be used a management/control computer for determining the execution time setting for each of the cleaning-fluid spraying phase, brushing phase, and drying phase. As such a management/control computer, can be used a server arranged in, for example, an air-traffic control room or a personal computer brought into any place in the eVTOL 100 by a maintenance worker who performs maintenance, checking, and cleaning of the eVTOL 100.

In accordance with the cleaning-fluid spraying phase of the cleaning program, the cleaning equipment 200 sprays cleaning fluid from a predetermined portion of the existing end of the second pole member 200b to a selected rotor 30.

Because the height of the first pole member 200a of the cleaning equipment 200 is adjustable, the height of the predetermined portion of the second pole member 200b can be adjusted to tailor the height of the selected rotor 30 located on the ground. The cleaning equipment 200 of the exemplary embodiment uses water as the cleaning fluid, but can use any type of cleaning chemicals in place of water.

In accordance with the brushing phase of the cleaning program, the height of the second pole member 200b of the cleaning equipment 200 is controlled so that one or more unillustrated brushes mounted to a surface of the existing end of the second pole member 200b, which faces the selected rotor 30, move. This results in the one or more brushes are fixedly positioned to abut onto the selected rotor 30. While the one or more brushes abut onto the selected rotor 30, the selected rotor 30 is controlled to rotate, so that the one or more brushes clean the selected rotor 30.

In accordance with the drying phase of the cleaning program, the selected rotor 30 is controlled to rotate at a predetermined rotational speed that is higher than that used in the brushing phase or the cleaning-fluid spraying phase. This rotation of the selected rotor 30 removes droplets of water and dirt attached to the selected rotor 30 from the selected rotor 30.

The storage 19b, which includes a ROM and a RAM, stores one or more control programs and the cleaning program. The storage 19b is additionally configured to store the measurement results sent from the sensors set forth above.

The I/O interface 19c is configured to enable the control apparatus 19 to communicate with external devices to thereby input and/or output various settings and/or values. The I/O interface 19c is configured to output instructions sent from instructions sent from the cleaning instructor 194 using wire communications or wireless communications to the cleaning equipment 200 through the aircraft communication unit 64.

The battery 40 is comprised of a lithium-ion battery, and serves as one power supply source in the eVTOL 100. The battery 40 is configured to mainly supply electrical power to the driver 11 included in each EDS 10 to accordingly drive, through the driver 11, the drive motor 12 of each EDS 10. The battery 40 can be comprised of any secondary battery, such as a nickel-metal-hydride battery in place of the lithium-ion battery. The eVTOL 100 can include, in addition to or in place of the battery 40, any power supply source, such as a fuel battery and/or a power generator.

The converter 42, which is connected to the battery 40, is configured to step down a voltage across the battery 40 to accordingly supply the stepped-down voltage to unillustrated auxiliary devices and the aircraft control apparatus 50.

The distributor 44 is configured to distribute the voltage across the battery 42 to the driver 11 of each EDS 10.

The external apparatus 500 includes the external controller 510 set forth above and an external communication unit 520.

The aircraft communication unit 64 has a function of performing wireless communications with any device. For example, the aircraft communication unit 64 enables each EDS 10 and the external communication unit 520 of the external apparatus 500 to communicate various information with each other, and enables each EDS 10 and the cleaning equipment 200 to communicate various information with each other. The aircraft communication unit 64 can communicate with the aircraft communication unit 52. As the wireless communications, the aircraft communication unit 64 can use (i) commercial very high frequency (VHF)

telecommunications, (ii) telecommunications, such as fourth-generation technology standard telecommunications (4G) or fifth-generation technology standard telecommunications (5G), provided by telecommunication cooperations, and/or (iii) wireless LAN communications in accordance with, for example, the IEEE 802.11 communications standard. The equipment communication unit 220 can use wired communications in accordance with the universal serial bus (USB) standard or the IEEE 802.3 communications standard.

The cleaning program according to the exemplary embodiment can serve as a motor-control program for cleaning recited in claims described later.

(II) Rotor Cleaning Routine

Figure 4:
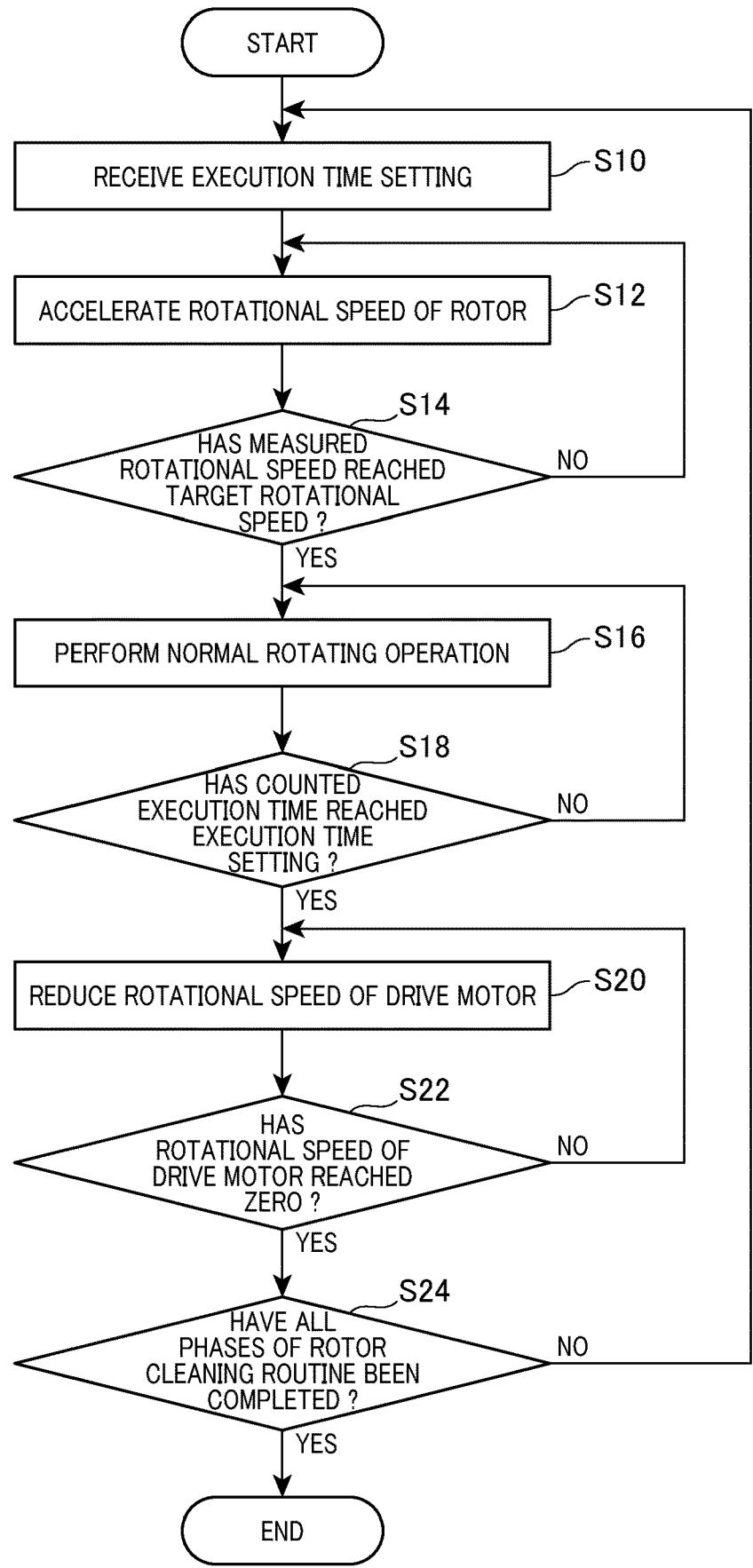
FIG. 4 is a flowchart illustrating a procedure of a rotor cleaning routine.

The CPU 19a serves as the cleaning instructor 194 to instruct the cleaning equipment 200 to perform cleaning in accordance with the cleaning program previously stored in the storage 19b, so that the CPU 19a and/or the cleaning equipment 200 start execution of a rotor cleaning routine, which is illustrated in FIG. 4, that cleans a selected rotor of the eVTOL 100. Specifically, the CPU 19a and/or the cleaning equipment 200 execute, as the rotor cleaning routine, the cleaning-fluid spraying phase, the brushing phase, and the drying phase while the eVTOL 100 is stopped on the ground.

In step S10 of the rotor cleaning routine, the CPU 19a receives the execution time setting for the cleaning-fluid spraying phase determined and sent from the external apparatus 500. Next, the CPU 19a serves as the drive controller 191 to instruct the driver 11 to rotate the selected rotor 30 and accelerate the rotational speed of the selected rotor 30 in step S12. After the operation in step S12, the cleaning equipment 200 is controlled to spray water as an example of cleaning fluid to the rotating rotor 30. While the rotational speed of the selected rotor 30 is accelerating, centrifugal force induced by the rotating selected rotor 30 enables the sprayed water to reach every part of the selected rotor 30 up to the outer periphery thereof.

Next, the CPU 19a serves as the measurement-result retrieving unit 192 to retrieve, from the rotational speed sensor 14, the rotational speed of the drive motor 12 as a measurement result by the rotational speed sensor 14 in step S14. Then, in step S14, the CPU 19a serves as the drive controller 191 to determine whether the rotational speed of the drive motor 12 measured by the rotational speed sensor 14 has reached a predetermined target rotational speed used for cleaning-fluid spraying.

In response to determination that the rotational speed of the drive motor 12 has not reached the predetermined target rotational speed (NO in step S14), the rotor cleaning routine returns to the operation in step S12.

Otherwise, in response to determination that the rotational speed of the drive motor 12 has reached the predetermined target rotational speed (YES in step S14), the CPU 19a serves as the drive controller 191 to instruct the driver 11 to perform a normal rotating operation that rotates the drive motor 12 while maintaining the rotational speed of the drive motor 12 substantially at the target rotational speed in step S16.

Next, the CPU 19a serves as the drive controller 191 to determine whether a counted execution time of the cleaning-fluid spraying phase has reached the execution time setting for the cleaning-fluid spraying phase in step S18. In response to determination that the counted execution time of the cleaning-fluid spraying phase has not reached the execution time setting for the cleaning-fluid spraying phase (NO in step S18), the rotor cleaning routine returns to the operation in step S16.

Otherwise, in response to determination that the counted execution time of the cleaning-fluid spraying phase has reached the execution time setting for the cleaning-fluid spraying phase (YES in step S18), the CPU 19a serves as the drive controller 191 to instruct the driver 11 to reduce the rotational speed of the drive motor 12 in step S20.

Next, the CPU 19a serves as the drive controller 191 to determine whether the rotational speed of the drive motor 12 has reached zero in step S22. In response to determination that the rotational speed of the drive motor 12 has not reached zero (NO in step S22), the rotor cleaning routine returns to the operation in step S20.

Otherwise, in response to determination that the rotational speed of the drive motor 12 has reached zero (YES in step S22), the CPU 19a serves as the drive controller 191 to determine whether all the cleaning-fluid spraying phase, brushing phase, and drying phase have been completely executed in step S24. At that time, because the brushing phase and the drying phase have not been executed yet (NO in step S24), the rotor cleaning routine returns to the operation in step S10.

In step S10, the CPU 19a receives the execution time setting for the brushing phase determined and sent from the external apparatus 500. After the operation in step S10, the cleaning equipment 200 is controlled so that the one or more brushes of the cleaning equipment 200 move, and thereafter are fixedly positioned to abut onto the selected rotor 30.

Next, the CPU 19a serves as the drive controller 191 to instruct the driver 11 to rotate the selected rotor 30 and accelerate the rotational speed of the selected rotor 30 in step S12. While the rotational speed of the selected rotor 30 is accelerating, the rotating selected rotor 30 with water drops is cleaned by the one or more brushes.

Thereafter, the operations in steps S14 to S22 for the brushing phase are carried out in the same manner as those for the cleaning-fluid spraying phase.

In response to determination that the rotational speed of the drive motor 12 has reached zero (YES in step S22), the CPU 19a serves as the drive controller 191 to determine whether all the cleaning-fluid spraying phase, brushing phase, and drying phase have been completely executed in step S24. At that time, because the drying phase has not been executed yet (NO in step S24), the rotor cleaning routine returns to the operation in step S10.

In step S10, the CPU 19a receives the execution time setting for the drying phase determined and sent from the external apparatus 500.

Next, the CPU 19a serves as the drive controller 191 to instruct the driver 11 to rotate the selected rotor 30 and accelerate the rotational speed of the selected rotor 30 in step S12.

While the rotational speed of the selected rotor 30 is accelerating, centrifugal force induced by the rotating selected rotor 30 blows away dirty and/or water drops attached to the selected rotor 30, thus drying the selected rotor 30.

Thereafter, the operations in steps S14 to S22 for the drying phase are carried out in the same manner as those for the cleaning-fluid spraying phase.

In response to determination that the rotational speed of the drive motor 12 has reached zero (YES in step S22), the CPU 19a serves as the drive controller 191 to determine whether all the cleaning-fluid spraying phase, brushing phase, and drying phase have been completely executed in step S24. At that time, because all the cleaning-fluid spraying phase, brushing phase, and drying phase have been completely executed (YES in step S24), the CPU 19a terminates the rotor cleaning routine.

The drive controller 191 is, as described above, configured to control, through the driver 11, the rotational speed of the drive motor 12 in the cleaning motor-control mode to a target rotational speed whose equivalent rotational frequency is lower than the predetermined human-audible frequency range, that is, lower than 20/A Hz where A represents the positive integer indicative of the number of blades of the rotor 30. In particular, the drive controller 191 is configured to determine the target rotational speeds in the respective cleaning-fluid spraying, brushing, and drying phases to be different from one another. Optimum values used for the respective target rotational speeds depend on, for example, the radius of the rotor (fan) 30. For example, the value of the target rotational speed used in the drying phase is higher than any other values of the target rotational speeds in the respective cleaning-fluid spraying phase and brushing phase, and the value of the target rotational speed used in the cleaning-fluid spraying phase is lower than any other values of the target rotational speeds in the respective brushing phase and dying phase. The value of the target rotational speed in the brushing phase is determined between the value of the target rotational speed used in the drying phase and the value of the target rotational speed in the cleaning-fluid spraying phase.

(III) Abnormal Situation Determination Routine

Figure 5:
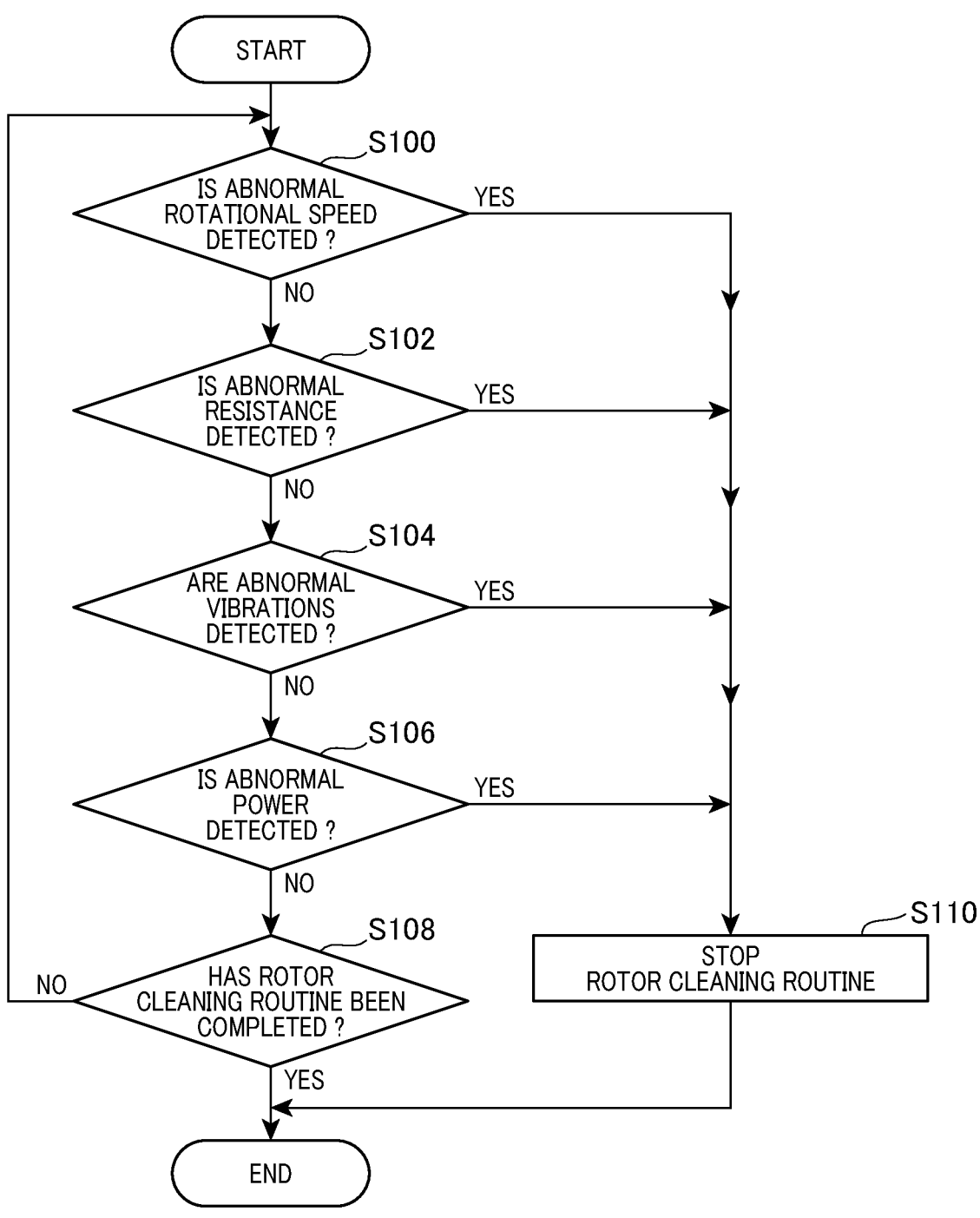
FIG. 5 is a flowchart illustrating a procedure of an abnormal situation determination routine.

The CPU 19a is programmed to execute, in step with start the rotor cleaning routine, an abnormal situation determination routine illustrated in FIG. 5. The abnormal situation determination routine represents a routine of determining whether there is an abnormal situation in the eVTOL 100 during execution of the rotor cleaning routine. The abnormal situation determination routine aims to forestall the occurrence of an abnormal situation, for example, an abnormal cleaning situation of the rotor 30 by the cleaning equipment 200. For example, the occurrence of an abnormal situation in the eVTOL 100 during execution of the rotor cleaning routine would result in, such as an abnormal cleaning situation of the rotor 30, uncontrollable movement of the rotor 30, which causes (i) the one or more brushes fixedly positioned in contact with the rotor 30 to fly or (ii) the eVTOL 100 to be out of balance.

In step S100 of the abnormal situation determination routine, the CPU 19a serves as the normality determiner 193 to determine, based on each measurement result of the rotational speed of the drive motor 12, whether an abnormal rotational speed is detected. For example, the CPU 19a serves as the normality determiner 193 to determine whether each measurement result of the rotational speed of the drive motor 12 is within the predetermined allowable rotational-speed range to accordingly determine whether an abnormal rotational speed, which lies outside the predetermined allowable rotational-speed range, is detected.

In response to determination that an abnormal rotational speed is detected (YES in step S100), the CPU 19a stops the rotor cleaning routine illustrated in FIG. 4 in step S110, and thereafter terminates the abnormal situation determination routine.

For example, in response to determination that an abnormal rotational speed is detected (YES in step S100), the CPU 19a serves as

(I) The cleaning instructor 194 to instruct the cleaning equipment 200 to stop execution of the cleaning task (II) The drive controller 191 to instruct the driver 11 to deactivate the drive motor 12 in step S110

In step S110, the CPU 19a changes the motor control mode from the cleaning motor-control mode to the stop mode Otherwise, in response to determination that the rotational speed of the drive motor 12 is within the allowable rotational-speed range, i.e., no abnormal rotational speed is detected (NO in step S100), the CPU 19a continues the cleaning motor-control mode in step S102. Additionally, in step S102, the CPU 19a serves as the normality determiner 193 to determine whether abnormal resistance is detected.

Specifically, during execution of the cleaning task, force acts on the rotor (fan) 30 from the one or more brushes abutting onto the rotor in the direction of stopping rotation of the rotor 30. This may result in a deviation between (i) a value of the target rotational speed to be controlled by the drive controller 191 through the driver 11 and (ii) a measured value of the rotational speed by the rotational speed sensor 34. The level of the deviation means resistance to rotation of the rotor 30. Additionally, the abnormal resistance means the level of the deviation is outside a predetermined allowable resistance-level range.

In response to determination that the level of the deviation is outside the predetermined allowable resistance-level range so that the abnormal resistance is detected (YES in step S102), the CPU 19a stops the rotor cleaning routine illustrated in FIG. 4 in step S110, and thereafter terminates the abnormal situation determination routine. The specific operation in step S110 in response to determination that the abnormal resistance is detected is substantially identical to that in response to determination that an abnormal rotational speed is detected, the specific operation in step S110 in response to determination that the abnormal resistance is detected.

Otherwise, in response to determination that the level of the deviation is within the predetermined allowable resistance-level range, i.e., no abnormal resistance is detected (NO in step S102), the CPU 19a continues the cleaning motor-control mode in step S104. Additionally, in step S104, the CPU 19a serves as the normality determiner 193 to determine whether abnormal vibrations are detected.

The abnormal vibrations can include vibrations, which are caused by the airframe 20 of the eVTOL 100 and measured by the acceleration sensor 29, being outside a predetermined allowable vibration range defined during the cleaning task.

The abnormal vibrations can include vibrations, which cause the airframe 20 to tilt at angles and are measured by the acceleration sensor 29; the angles of tilt of the airframe 20 being outside a predetermined allowable angular range defined during the cleaning task.

In response to determination that abnormal vibrations are detected (YES in step S104), the CPU 19a stops the rotor cleaning routine illustrated in FIG. 4 in step S110, and thereafter terminates the abnormal situation determination routine. The specific operation in step S110 in response to determination that the abnormal resistance is detected is substantially identical to that in response to determination that an abnormal rotational speed is detected, the specific operation in step S110 in response to determination that the abnormal resistance is detected.

Otherwise, in response to determination that no abnormal vibrations are detected (NO in step S104), the CPU 19a continues the cleaning motor-control mode in step S106.

Additionally, in step S106, the CPU 19a serves as the normality determiner 193 to determine whether abnormal power is detected.

The abnormal power means a power level calculated based on a measured value of the drive current by the current sensor 15 and a measured value of the drive voltage by the voltage sensor 16 being outside a predetermined allowable power-level range defined during the cleaning task.

In response to determination that abnormal power is detected (YES in step S106), the CPU 19a stops the rotor cleaning routine illustrated in FIG. 4 in step S110, and thereafter terminates the abnormal situation determination routine. The specific operation in step S110 in response to determination that the abnormal resistance is detected is substantially identical to that in response to determination that an abnormal rotational speed is detected, the specific operation in step S110 in response to determination that the abnormal resistance is detected.

Otherwise, in response to determination that no abnormal power is detected (NO in step S106), the CPU 19a continues the cleaning motor-control mode in step S108. Additionally, in step S108, the CPU 19a serves as the drive controller 191 to determine whether the rotor cleaning routine illustrated in FIG. 4 has been completed. In response to determination that the rotor cleaning routine illustrated in FIG. 4 has not been completed yet (NO in step S108), the abnormal situation determination routine returns to step S100. Otherwise, in response to determination that the rotor cleaning routine illustrated in FIG. 4 has been completed (YES in step S108), the CPU 19a terminates the abnormal situation determination routine.

The operation of changing the motor control mode from the cleaning motor-control mode to the stop mode in step S110 included in the abnormal situation determination routine can correspond to an operation of stopping the drive motor 12 in the claims described later.

The control apparatus 19 of the exemplary embodiment described above is configured to control, in the cleaning motor-control mode, the rotational speed of the drive motor 12 such that the rotational frequency equivalent to the controlled rotational speed is lower than the predetermined human-audible frequency range. This configuration therefore makes it possible to clean the rotor 30 of the eVTOL 100 while preventing an excessive increase in noise due to rotation of the rotor 30.

Specifically, the control apparatus 19 is configured to adjust the rotational frequency of the drive motor 12 of the rotor 30 to be lower than 20/A Hz where A represents a positive integer indicative of the number of blades of the rotor 30. This configuration therefore efficiently reduces noise whose level is based on the number of blades of the rotor 30.

The control apparatus 19 includes the measurement-result retrieving unit 192 configured to retrieve, from, for example, each sensor 14, 15, 16, and 29, the corresponding measurement results, and the normality determiner 193 configured to determine, based on the retrieved measurement results, whether there is an abnormal situation in the eVTOL 100. The control apparatus 19 is configured to stop, in the cleaning motor-control mode, the cleaning task of the rotor 30 in response to determination that there is an abnormal situation in the eVTOL 100. This configuration therefore avoids the occurrence of an abnormal situation in the eVTOL 100 during cleaning the rotor 30

The control apparatus 19 additionally includes the cleaning instructor 194 and the I/O interface 19c. This configuration makes it possible to send an instruction that instructs the cleaning equipment 200 to perform the cleaning task for cleaning the rotors 30.

The control apparatus 19 is configured to control, in the cleaning motor-control mode, the drive motor 12 in accordance with the cleaning program previously stored in the storage 19b, making it possible to automatically perform each of the cleaning-fluid spraying phase, brushing phase, and drying phase of the cleaning task.

OTHER EMBODIMENTS AND/OR MODIFICATIONS

The rotational frequency of the drive motor 12 according to the exemplary embodiment is controlled by the control apparatus 19 to be lower than 20/A Hz where A represents a positive integer indicative of the number of blades of the rotor 30, but the present disclosure is not limited thereto. Specifically, the rotational frequency of the drive motor 12 according to the exemplary embodiment can be adjusted by the control apparatus 19 to a value lower than the predetermined human-audible frequency range.

The measurement-result retrieving unit 192 of the control apparatus 19 according to the exemplary embodiment is configured to retrieve the measurement results including (I) The rotational speed of the drive motor 12 from the rotational speed sensor 14

(II) Information on a rotating resistance related to the rotational speed of the corresponding rotor 30 from the rotational speed sensor 34

(III) The drive current from the current sensor 15

(IV) The drive voltage from the voltage sensor 16

(V) The level of vibrations related to the eVTOL 100 from the acceleration sensor 29

(VI) The degree of tilt of the eVTOL 100 from the acceleration sensor 29

The present disclosure is however not limited to this configuration. Specifically, the measurement-result retrieving unit 192 of the control apparatus 19 according to the exemplary embodiment can be configured to retrieve a part of the measurement results.

The cleaning instructor 194 of the control apparatus 19 according to the exemplary embodiment is configured to send, to the cleaning equipment 200, one or more instructions that instruct the cleaning equipment 200 to perform (i) a cleaning-fluid spraying task, (ii) a brushing task, and (iii) a drying task. Additionally, the cleaning instructor 19 can be configured to send, to the cleaning equipment 200, one or more instructions that instruct the cleaning equipment 200 to perform other types of cleaning tasks. For example, the cleaning instructor 19 can send, to the cleaning equipment 200, a task of covering each rotor 30 with wax coating.

The control apparatus 19 is configured to control, in the cleaning motor-control mode, the drive motor 12 in accordance with the cleaning program previously stored in the storage 19b, but the present disclosure is not limited thereto. Specifically, the control apparatus 19 can be configured to control the drive motor 12 in accordance with one or more instructions sent from any external apparatus, such as the external apparatus 500.

The control apparatus 19 according to the exemplary embodiment is installed in the eVTOL 100, but can be installed in any other types of electric aircrafts. The eVTOL 100 according to the exemplary embodiment, which is configured as an uncrewed aircraft, but can be configured as a crewed aircraft.

The control apparatus 19 according to the exemplary embodiment is programmed to execute the abnormal situation determination routine, but can be programmed not to execute the abnormal situation determination routine.

The control apparatus 19 according to the exemplary embodiment is configured to control the drive motor 12 in one of the motor-control modes including at least three drive-motor control modes, such as the flying motor-control mode, the cleaning motor-control mode, and the stop mode, but can be configured control the drive motor 12 in any one of the flying motor-control mode and the cleaning motor-control mode. The control apparatus 19 can also be configured to control the drive motor 12 in any type control mode in addition to the flying motor-control mode, the cleaning motor-control mode, and the stop mode.

To sum up, it is preferable that the control apparatus 19 according to the present disclosure can be configured to selectively control the drive motor 12 in at least one of the flying motor-control mode and the cleaning motor-control mode.

The present disclosure is not limited to the above exemplary embodiment and the other embodiments and/or modifications, and can be implemented by various configurations within the scope of the present disclosure. For example, technical features included in the above exemplary embodiment and the other embodiments and/or modifications, which correspond to technical features included in exemplary measures described in the SUMMARY of the present disclosure, can be freely combined with each other or can be freely replaced with another feature in order to solve a part or all of the above issue and/or achieve a part or all of the above advantageous benefits. One or more of the technical features included in the above exemplary embodiment, which are not described as essential elements in the specification, can be deleted as necessity arises.

The control apparatuses and their control methods described in the present disclosure can be implemented by a dedicated computer including a memory and a processor programmed to perform one or more functions embodied by one or more computer programs.

The control apparatuses and their control methods described in the present disclosure can also be implemented by a dedicated computer including a processor comprised of one or more dedicated hardware logic circuits.

The control apparatuses and their control methods described in the present disclosure can further be implemented by a processor system comprised of a memory, a processor programmed to perform one or more functions embodied by one or more computer programs, and one or more hardware logic circuits.

The one or more programs can be stored in a computer-readable non-transitory storage medium as instructions to be carried out by a computer or a processor.

The invention claimed is:

1. A control apparatus for controlling a drive motor that drives a rotor installed in an electrical aircraft, the control apparatus being configured to:

instruct the drive motor to selectively operate in at least two motor-control modes that include:

a flying motor-control mode for causing the electrical aircraft to fly; and a cleaning motor-control mode for cleaning the rotor;

control, in the cleaning motor-control mode, the drive motor to rotate at a predetermined rotational frequency that is lower than a lower limit of a predetermined human-audible frequency range; and control, in the cleaning motor-control mode, the drive motor such that the predetermined rotational frequency is lower than 20/A Hz where A represents a positive integer indicative of the number of blades of the rotor.

2. The control apparatus according to claim 1, further comprising:

a measurement-result retrieving unit configured to retrieve at least one of measurement results that include:

a rotational speed of the drive motor;

a rotating resistance related to the drive motor;

a drive current related to the drive motor a drive voltage related to the drive motor a level of vibrations related to the electrical aircraft; and a degree of tilt of the electrical aircraft; and a normality determiner configured to determine whether there is an abnormal situation in the electrical aircraft in accordance with the retrieved at least one of the measurement results, the at least two motor-control modes including a stop mode for stopping the drive motor, the control apparatus being configured to, in response to determination that there is an abnormal situation in the electrical aircraft during control of the drive motor in the cleaning motor-control mode, change the cleaning motor-control mode to the stop mode, the control apparatus being configured to, in response to determination that there are no abnormal situations in the electrical aircraft during control of the drive motor in the cleaning motor-control mode, continue the cleaning motor-control mode.

3. The control apparatus according to claim 1, further comprising:

a measurement-result retrieving unit configured to retrieve at least one of measurement results that include:

a rotational speed of the drive motor;

a rotating resistance related to the drive motor;

a drive current related to the drive motor a drive voltage related to the drive motor a level of vibrations related to the electrical aircraft; and a degree of tilt of the electrical aircraft; and a normality determiner configured to determine whether there is an abnormal situation in the electrical aircraft in accordance with the retrieved at least one of the measurement results, the at least two motor-control modes including a stop mode for stopping the drive motor, the control apparatus being configured to, in response to determination that there is an abnormal situation in the electrical aircraft during control of the drive motor in the cleaning motor-control mode, change the cleaning motor-control mode to the stop mode, the control apparatus being configured to, in response to determination that there are no abnormal situations in the electrical aircraft during control of the drive motor in the cleaning motor-control mode, continue the cleaning motor-control mode.

4. The control apparatus according to claim 1, further comprising:

a cleaning instructor configured to send, to cleaning equipment, an instruction that instructs the cleaning equipment to perform a cleaning task for cleaning the rotor in the cleaning motor-control mode, the cleaning task including a task of spraying cleaning fluid, a brushing task, and a drying task; and an input/output interface configured to enable the control apparatus to communicate with one or more external devices using a wire communication or a wireless communication, so that the instruction is sent to the cleaning equipment through the input/output interface.

5. The control apparatus according to claim 1, further comprising:

a cleaning instructor configured to send, to cleaning equipment, an instruction that instructs the cleaning equipment to perform a cleaning task for cleaning the rotor in the cleaning motor-control mode, the cleaning task including a task of spraying cleaning fluid, a brushing task, and a drying task; and an input/output interface configured to enable the control apparatus to communicate with one or more external devices using a wire communication or a wireless communication, so that the instruction is sent to the cleaning equipment through the input/output interface.

6. The control apparatus according to claim 2, further comprising:

a cleaning instructor configured to send, to cleaning equipment, an instruction that instructs the cleaning equipment to perform a cleaning task for cleaning the rotor in the cleaning motor-control mode, the cleaning task including a task of spraying cleaning fluid, a brushing task, and a drying task; and an input/output interface configured to enable the control apparatus to communicate with one or more external devices using a wire communication or a wireless communication, so that the instruction is sent to the cleaning equipment through the input/output interface.

7. The control apparatus according to claim 1, wherein:

the control apparatus is configured to:

control, in the flying motor-control mode, the drive motor in accordance with a flying instruction sent from an aircraft control apparatus for controlling how the electrical aircraft flies; and control, in the cleaning motor-control mode, the drive motor in accordance with an externally sent instruction and/or a cleaning-motor control program previously stored in the control apparatus.

8. The control apparatus according to claim 1, wherein:

the control apparatus is configured to:

control, in the flying motor-control mode, the drive motor in accordance with a flying instruction sent from an aircraft control apparatus for controlling how the electrical aircraft flies; and control, in the cleaning motor-control mode, the drive motor in accordance with an externally sent instruction and/or a cleaning-motor control program previously stored in the control apparatus.

9. The control apparatus according to claim 2, wherein:

the control apparatus is configured to:

control, in the flying motor-control mode, the drive motor in accordance with a flying instruction sent from an aircraft control apparatus for controlling how the electrical aircraft flies; and control, in the cleaning motor-control mode, the drive motor in accordance with an externally sent instruction and/or a cleaning-motor control program previously stored in the control apparatus.

10. The control apparatus according to claim 3, wherein:

the control apparatus is configured to:

control, in the flying motor-control mode, the drive motor in accordance with a flying instruction sent from an aircraft control apparatus for controlling how the electrical aircraft flies; and control, in the cleaning motor-control mode, the drive motor in accordance with an externally sent instruction and/or a cleaning-motor control program previously stored in the control apparatus.

* * * * *